United States Patent
Allee

(10) Patent No.: US 6,378,539 B1
(45) Date of Patent: Apr. 30, 2002

(54) UNIVERSAL WHEELCHAIR UMBRELLA AND SHEATH

(76) Inventor: Edward Allee, # 8 Lehigh Valley Dr., Springfield, IL (US) 62702

( * ) Notice: Subject to any disclaimer, the term of this patent is extended or adjusted under 35 U.S.C. 154(b) by 0 days.

(21) Appl. No.: 09/562,935

(22) Filed: May 2, 2000

(51) Int. Cl.[7] .................................................. A45B 3/00
(52) U.S. Cl. ..................... 135/16; 297/188.04; 248/534
(58) Field of Search ................................. 135/88.03, 16, 135/96, 90, 117, 98; 297/184.1, 184.15, 184.11, 188.01, 188.04, 188.05, 188.06, 188.07, 188.14, 188.18, 188.2, 188.21; 248/314, 316.2, 534; 403/110

(56) References Cited

U.S. PATENT DOCUMENTS

| | | | | |
|---|---|---|---|---|
| 4,852,896 A | * | 8/1989 | Mills | 280/47.18 |
| D330,630 S | * | 11/1992 | Loden | D3/10 |
| 5,396,915 A | * | 3/1995 | Bomar | 135/16 |
| 5,431,364 A | * | 7/1995 | Etter | 135/16 |
| 5,441,067 A | | 8/1995 | James et al. | |
| 5,593,205 A | | 1/1997 | Vanderminden, Sr. et al. | |
| 5,609,321 A | * | 3/1997 | McClellan | 248/534 |
| 5,638,849 A | | 6/1997 | Scott | |
| 5,713,627 A | * | 2/1998 | DeFillippo | 135/16 |
| 5,762,308 A | * | 6/1998 | Bryan | 135/16 |
| 5,791,761 A | * | 8/1998 | Bryant | 297/217.6 |
| 5,836,327 A | * | 11/1998 | Davis | 135/16 |
| 5,921,258 A | | 7/1999 | Francois | |
| 5,967,601 A | | 10/1999 | Gillins | |

* cited by examiner

Primary Examiner—Beth A. Stephan
(74) Attorney, Agent, or Firm—Patent & Trademark Services; Thomas Zack; Joseph H. McGlynn

(57) ABSTRACT

An umbrella holders a modified umbrella and a storage sheath all mounted on a wheelchair. The umbrella's lower end is modified with a threaded surface received in a hole of the umbrella holder. The umbrella holder is used to hold the umbrella in an upright position may be mounted to the frame structure of the transporter in different ways. One is to fit in the end of an transporter's arm rest where held by fasteners. Another is to clamp it around the arm rest and holder. If it is desired to mount the umbrella holder vertically, extensions configured in the shape of the arm rest may be used. The sheath is also mounted to the frame structure of the transporter. The sheath mounting can be done in several ways One is by plastic tie(s) around the sheath and around the frame structure. Another is by bolts that extend through the sheath into the transporter's seat or by a clamp structure. The sheath's end cap may be held to the sheath by glue and a bolt that goes across the hollow interior of the sheath to insure the umbrella does not fall through.

7 Claims, 5 Drawing Sheets

UNIVERSAL WHEELCHAIR UMBRELLA AND SHEATH

BACKGROUND OF THE INVENTION

This invention relates to a fixture for holding an umbrella to a person transporter, such as a wheelchair or the like.

Transporters, like wheelchairs, whether manually operated or powered by a motor have a need for a sun and weather shade or umbrella to protect the occupant from the sun and weather. Various prior art methods have been used to store a closed umbrella or sun shade and to hold the opened umbrella or sun shade on the wheelchair or chair. For example, in one earlier invention a sun shade has a screw operated clamp used to attach the shade to a chair.

In another earlier invention a canopy for a beach chair uses clamping plates for securing a canopy to the top of the chair.

Another prior art patent discloses a removable sun screen attached to a chair by means of a pole attached to the sun screen and a pair of brackets that receive the pole. While another invention discloses a rotating bracket for holding a sun shade on a wheelchair and which allows the sun shade to be rotated to different positions. Still another patent discloses a sun shade apparatus mounted to a lawn chair.

DESCRIPTION OF THE PRIOR ART

Various types of systems have been used to attach sun shades or umbrellas to chairs including wheelchairs. For example, U.S. Pat. No. 5,441,067 to James et al. discloses a sun shade with a screw operated clamp used to attach the shade to a chair.

U.S. Pat. No. 5,593,205 to Vanderminden, Sr. et al. discloses a canopy for a beach chair uses clamping plates for securing a canopy to the top of the chair.

U.S. Pat. No. 5,638,849 to Scott discloses a removable sun screen attached to a chair by means of a pole attached to the sun screen and a pair of brackets that receive the pole.

U.S. Pat. No. 5,921,258 to Francois discloses a a rotating bracket for holding a sun shade on a wheelchair and which allows the sun shade to be rotated to different positions.

U.S. Pat. No. 5,967,601 to Gillins discloses a a sun shade apparatus mounted to a lawn chair.

In the present invention a fixture is used to hold a closed umbrella having a tubular sheath and a bracket is used to hold the umbrella in an opened position all as will be detailed in the specification that follows hereafter.

SUMMARY OF THE INVENTION

This invention relates to a fixture mounted on a wheelchair for holding a closed umbrella having a tubular sheath combined with an additional bracket for holding the opened umbrella.

It is the primary object of the present invention to provide for a two umbrella holding members mounted to a wheelchair for holding the closed umbrella and the opened umbrella.

Another object is to provide for such a combination in which the holder for the closed umbrella consists of a tubular sheath while the holder for the opened umbrella is a bracket.

These and other objects and advantages of the present invention will become apparent to readers from a consideration of the ensuing description and the accompanying drawings.

BRIEF DESCRIPTION OF THE DRAWINGS

FIG. 2(*b*) is cross section side view of the bore hole shown in FIG. 2(*a*).

FIG. 4(*b*) is a side cross sectional view of an alternate mounted for a circular in cross section arm rest when mounting the umbrella in a vertical position.

FIG. 4(*c*) is a cross sectional view, like FIG. 4(*b*), when the arm rest is square in cross section.

FIG. 5(*b*) is a side perspective view of the holder used for the umbrella.

FIG. 5(*c*) is an end view showing the holder within the arm rest of the transporter held by mounting screws.

FIG. 6(*b*) is a front view of the storage sheath of FIG. 6(*a*) with the end cap removed.

DESCRIPTION OF THE PREFERRED EMBODIMENT

Figure 1:
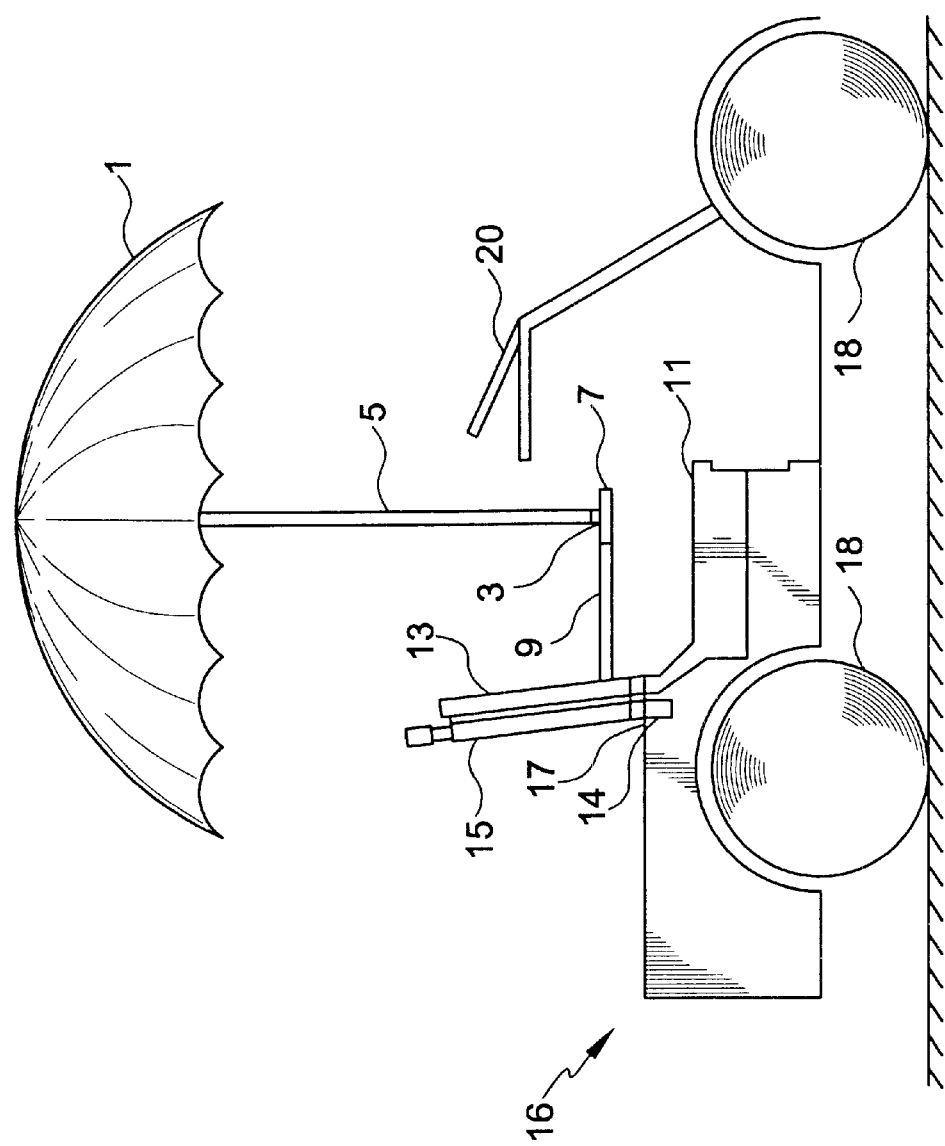
FIG. 1 is a side view of the preferred embodiment of the invention with the umbrella's canopy in an opened position.
Figure 2:
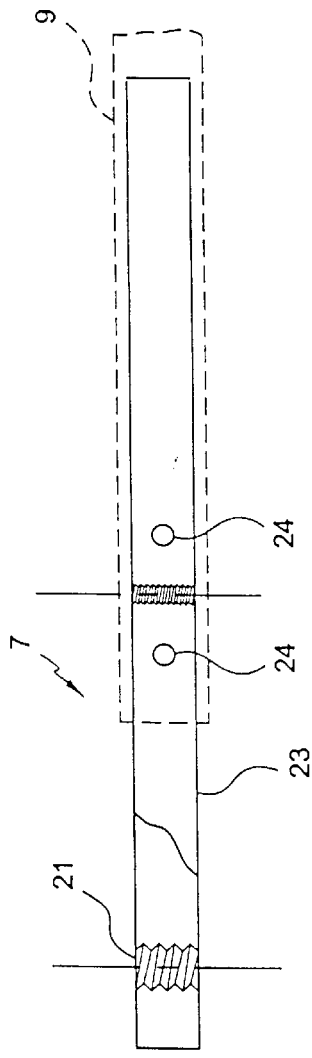
FIG. 2 (*a*) is a side view of the umbrella holder with the internal threaded bore hole shown in a cut away section.
Figure 2:
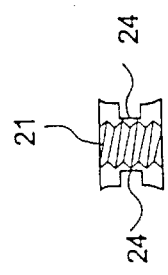

FIG. 1 is a side view of the preferred embodiment of the invention with the umbrella's protective canopy 1 in an opened position. The umbrella is conventional in design except for the lower vertical handle 3 portion. This lower portion 3 of the vertical support shaft 5 has been modified by removing the conventional handle grip and replacing it with the tubular lower handle portion 3 or the insertion of a piece of all thread The lower handle portion has external threads (see FIG. 5(*a*)) used to screw the supporting shaft 5 into the umbrella holder 7. As best shown in FIGS. 2(*a*)–2(*b*) and 3, the umbrella holder 7 is an extension to the typical arm rest frame structure member 9 of the scooter shown. The same type of armrests are commonly found in the frame structures of manually operated wheelchairs and could be used for the same purpose. Below the frame's armrest is the user's seat 11. A seat back frame support 13 positioned at approximately a right angle from the horizontally disposed seat 11 is also shown, Behind the back support is a tubular sheath 15 having an opened top used to store and transport the umbrella when it is in a closed position. The sheath 15 is held to the scooter's frame structure by bolts and lock washers drilled and tapped into the back frame support 13. An end cap of PVC (polyvinyl chloride) is glued to the tube which keeps the umbrella from falling through the hollow tubular sheath 15 when the closed umbrella is placed with the bottom end up and the canopy 1 down into the sheath, as shown in dotted line format. The scooter 16 is conventional in design and has either three or four ground engaging wheels 18, the two near side ones of which are shown, an electrically operated battery powered engine to propel the scooter (not shown) and a front steering hand grip 20.

FIG. 2 (*a*) is a side view of the umbrella holder 7 with the internal threaded bore hole 21 shown in a cut away section view while extending down through the component 23 of the holder. The horizontally disposed component 23 of the holder fits into the arm rest 9 and is rigidly attached to the same by bolts that are received in holes 24 in component 23.

Aligned holes in the armrest permit the bolts to extend through both members. FIG. 2(b) is cross section side view of the bore hole 21 shown in FIG. 2(a). The side holes 24 are shown to the rear of and on both sides of the bore hole 21.

Figure 3:
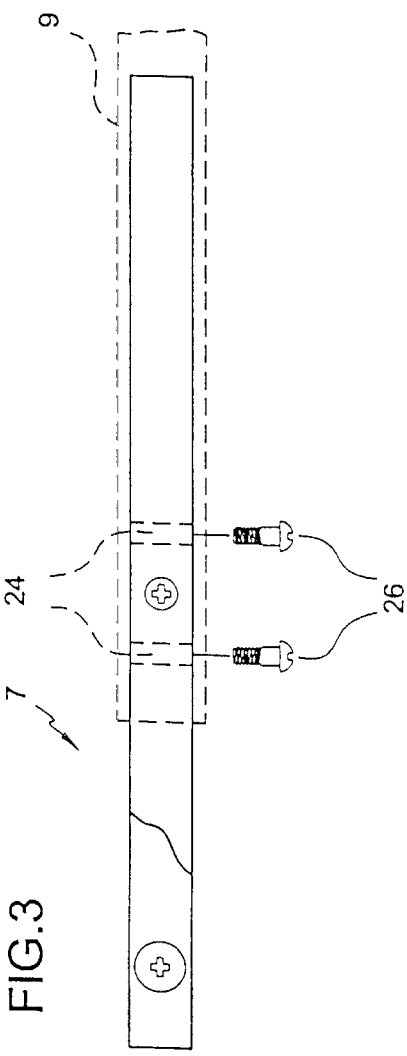
FIG. 3 is a top view of the umbrella holder shown in FIG. 2(*a*).

FIG. 3 is a top view of the umbrella holder 7 shown in FIG. 2(a) with added bolts 26. The bolts 26 are shown just before being inserted into holes in the arm rest which are aligned with the holes 24 in the holder. When the bolts are inserted through the arm rest and holder the straight holder component 23, the holder is rigidly fixed to the armrest. The threaded through hole 21 is adapted to receive the modified end 3 of the inserted umbrella to hold the umbrella in an upright position when opened to provide shade and protection from the weather, such as rain, snow, etc., when outdoors.

Figure 4:
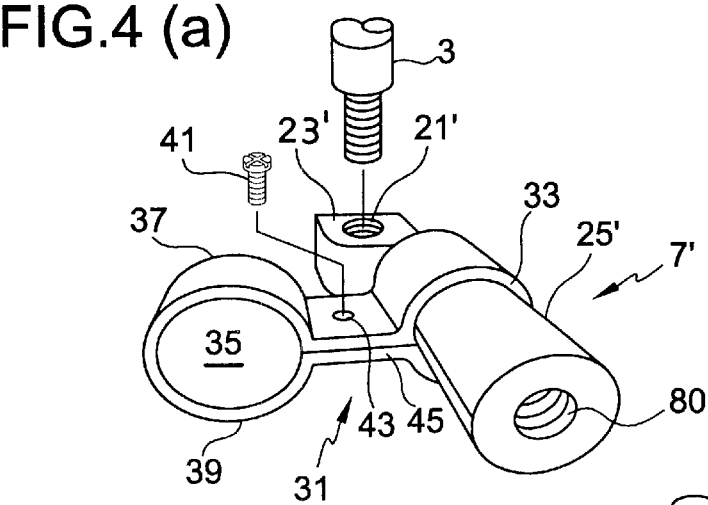
FIG. 4(*a*) is a perspective view of an alternate clamp attachment for the umbrella holder.
Figure 4:
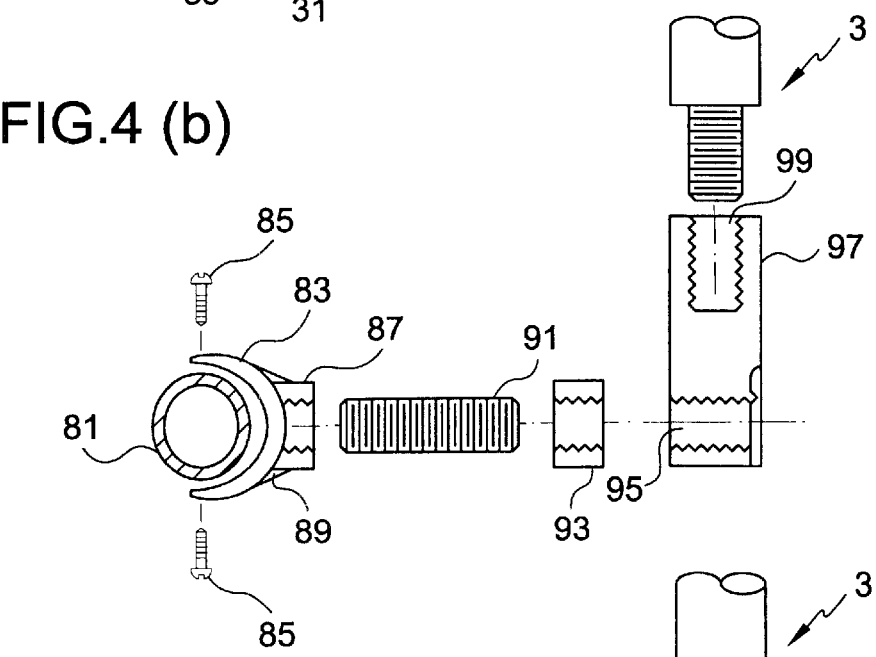
Figure 4:
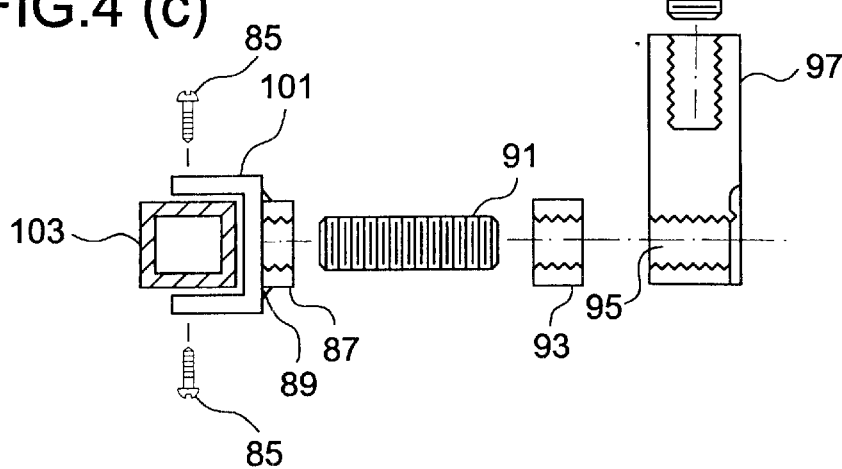

FIG. 4(a) is a perspective view of an alternate clamp attachment for the the umbrella holder 7'. The holder is slightly modified from the holder 7 of FIGS. 1, 2(a), 2(b) and 3 in that it is fastened to the armrest of the person transporter by a double holed clamp 31. One of the clamp holes 33 is viewed around the outer diameter of holder's horizontal component 25'. The other hole 35 is positioned to receive and extend around the outside diameter of the armrest 9. The clamp itself in made of an upper section 37 with two semi-circular ends and a lower mating section 39 of the same configuration. By joining the two clamp sections together with a threaded bolt 41 through the clamp hole 43 that extends through both sections, the mentioned two circular holes (33 and 35) are formed joined by the connection flat members 45. This particular alternate holder clamp would be used when the armrest of the transporter is not hollow with an opened end into which the holder's component 23 can be inserted as in the earlier FIG. 1 embodiment. By selecting a clamp size or shape that correlates with the exterior configuration of the arm rest, almost any transporter armrest can be used to hold the holder 7 with the FIG. 4(a) alternate clamp design. The lower portion 3 of the umbrella is more clearly shown in FIG. 4(a) as it is about to be inserted into the threaded bore hole 21' located at one of the two free ends 23' of the holder. The umbrella handle portion 3 would be the same regardless of which embodiment is used.

A threaded end bore hole 80 that is oriented at ninety degrees with respect to the opposite end threaded hole 21' permits the holder 7' of FIG. 4(a) to be vertically oriented to accept the threaded umbrella lower end. Having two threaded holes at right angles to each other allows the umbrella to be mounted in the holder whether the holder is horizontally disposed or vertically. FIGS. 4(b) and 4(c) show side views of how the holder can be mounted vertically when the cross section of the arm rest for the vehicle is either round or square. In FIG. 4(b), the arm rest 81 for the vehicle, like a wheel chair or scooter, has a circular configuration in cross section. A C-shaped fitting 83 extends around at least 180 degrees of the arm rest and is retained in position by two opposite metal screws 85. An internally threaded extension 87 to the fitting 83 has interfacing welds 89 to insure a firm mount. Aligned with the bore hole in extension 87 is a piece of all thread segment 91. At the other end of this segment a locking nut 93 is used to retain the segment in a bore hole 95 located in modified umbrella holder 97. Holder 97 has an end bore, like bore hole 80 of FIG. 4(a), which can receive and retain the threaded lower end of the umbrella.

FIG. 4(c) is essentially the same as FIG. 4(b) except that the arm rest and its mating fitting are shaped differently. The same component parts have the same numbers in each of these two views. The fitting 101 in FIG. 4(c) is configured in cross section with three sides that join at right angles. This allows the surfaces of the fitting to lie flat against the square cross section of the arm rest 103. As before, there are two opposite side retaining screws 85 to hold the fitting to the arm rest and reinforcing welds 89 to retain the fitting to its extension 87.

Figure 5:
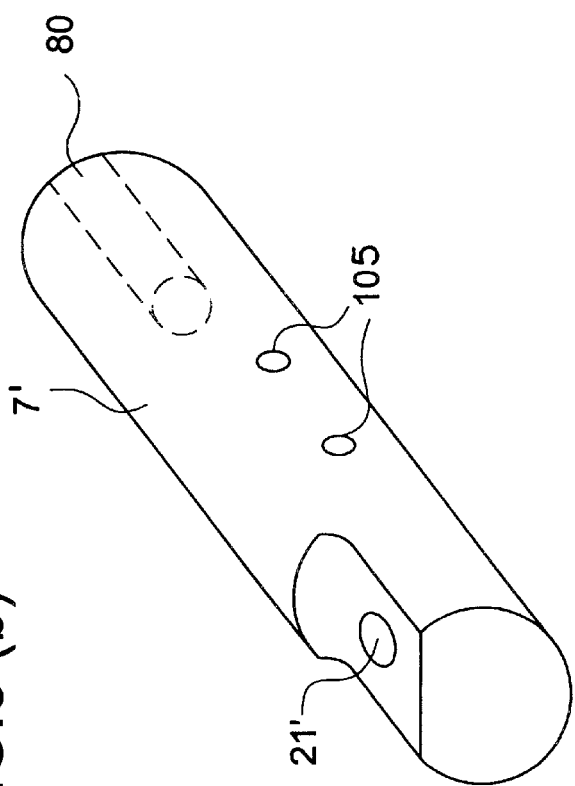
FIG. 5(*a*) is a side view of the modified lower portion of the umbrella's handle.
Figure 5:
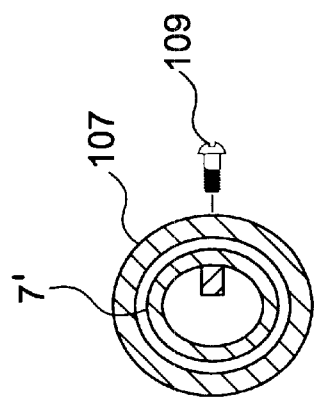
Figure 5:
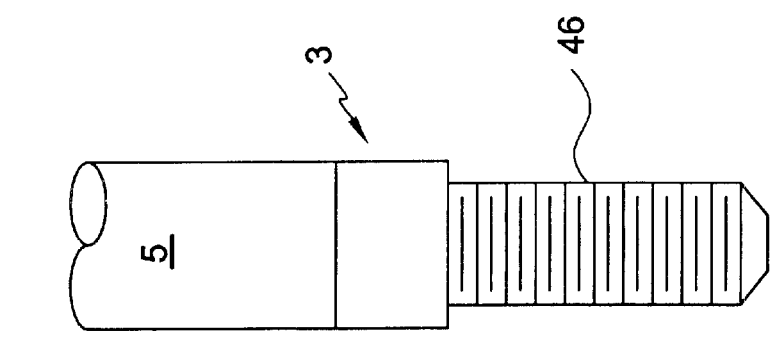

FIG. 5 (a) is a side view of the modified lower portion 3 of the umbrella's handle. Above this portion is the vertical shaft 5 used to hold the upper canopy 1. At the lower end of the shaft 5 and has an extending free end threaded portion 46. It is the threads 46 that are inserted and screwed into the holder holes 21, 21', or 97 previously mentioned. If a chair has a hollow arm rest with a removable end cap, then this cap may be removed and the holder 7' inserted to the hollow portion. Holes drilled through the arm rest along the length of the inserted holder permit fastening screws to retain the holder to the armrest. FIGS. 5 (b) and (c) illustrate such an arrangement. In FIG. 5 (b) the holder 7' is reversed from the view of FIG. 4(a). Two spaced side screw receiving bore holes 105 are shown. When the umbrella holder 7' is inserted into the opened end of the arm rest of a transporter, the holder would be surrounded along its length by the arm rest. FIG. 5 (c) is a cross sectional view of the in place holder 7' positioned within the confines of the circular in cross section arm rest 107 (like that of FIG. 4(b)) whose end cap has been previously removed to permit this insertion. Retaining metal screws 109 inserted through predrilled holes in the arm rest extend into the holder holes 105 to retain the arm rest to the holder. The holder's bore hole 21' and the end part of the holder are located outside the arm rest to permit the insertion of the umbrella threaded end portion 46 into this bore hole.

Figure 6:
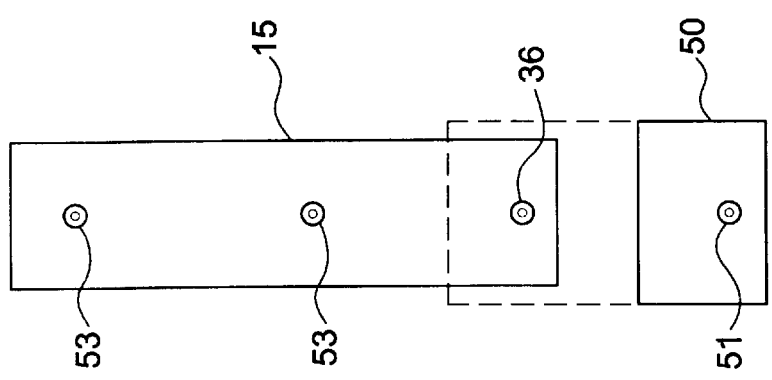
FIG. 6(*a*) is a side view of the umbrella storage sheath.
Figure 6:
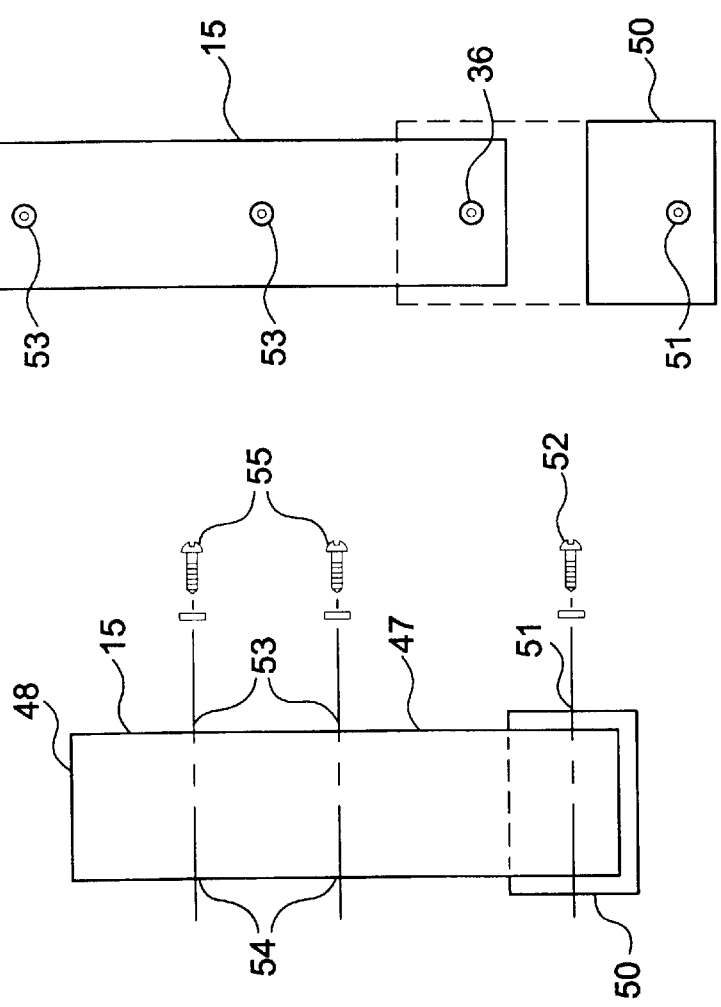

FIG. 6(a) is a side view of the umbrella storage sheath 15. The umbrella storage sheath is used to hold the closed umbrella for storage or transport, or both. The major portion of the sheath consists of a hollow tubular section 47 with an opened top 48. A lower enlarged end cap 50 has a threaded through hole 51 which can receive the threaded set screw or bolt 52. A holed nut placed on the opposite entry side of hole 51 is used to fasten the screw 52 or bolt's free end when fully extended through the walls of the section 47. When the nut (not shown) is so fastened to the screw 52 through the end cap 50 of the bigger outer cap hole into the second smaller sheath hole, this fastens the cap to the sheath. The end cap 50 keeps the umbrella from descending completely through the hollow tubular sheath 15. Upper larger diameter vertically spaced holes 53 in wall of the sheath 15 are each used to receive a bolt and lock washer 55 which goes through them and into smaller aligned holes 54 in the opposite side wall of the sheath. When so place in the smaller holes the bolt and lock washer 55 project into the back of the transport seat 13 to mount the sheath to the seat.

FIG. 6(b) is a front view of the storage sheath of FIG. 6(a) with the end cap 50 removed from the hollow end of the sheath 15. In this view the cap hole 51 is visible as well as the engaging sheath hole 56 which receives the bolt 52 previously shown in FIG. 6(a). The two large diameter sheath holes 53 used to receive the bolts 55 are also visible.

Figure 7:
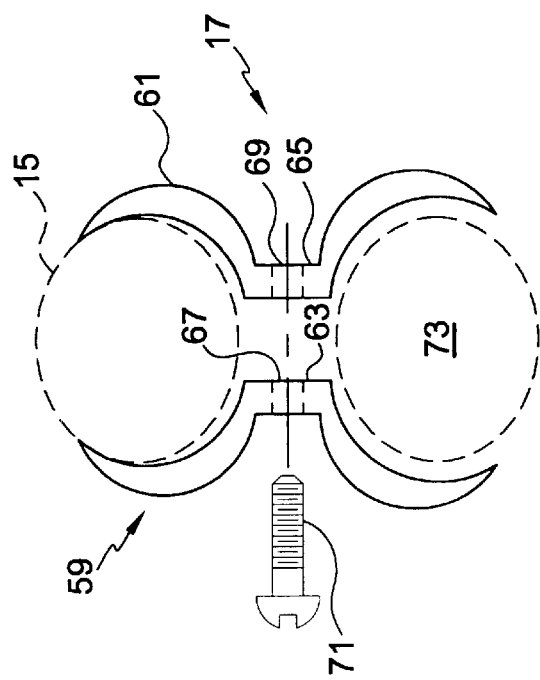
FIG. 7 is a top view of the clamp used to hold the storage sheath to the frame of a transporter such as a scooter, wheelchair or walker.

FIG. 7 is a top view of a clamp 17 that can be used to hold the storage sheath 15 to the frame of the transporter 1 behind the back rest 13. This would be used an alternative to the FIGS. 6(a) and 6(b) method of attaching the sheath to the transporter. The two piece clamp 17 is very similar to the FIG. 4 alternate clamp attachment. Two mating sections 59 and 61 each have semi-circular ends which can mate to form circles at each end. Mid sections 63 and 65 in each section 59 and 61 joins the two semi-circular ends together. Within the mid sections are two through aligned threaded holes 67 and 69 which are adapted to receive the threaded bolt 71.

When so received, the two joined sections form two aligned circular member. One of the formed members goes around the outside diameter of the sheath 15, shown in dotted line format, while the other hole goes around an adjacent vertical frame member 73 of the transporter. This arrangement allows for the mounting of the sheath to the person transporter without drilling holes in the sheath or the frame of the transporter.

Alternatively, clamp 17 can be replaced by a twist tie or plastic tie that wraps around the frame of the transporter 1 and the sheath 15 with unused portion of the ties lengths being cut off.

Clearly other variations to those shown are contemplated. For example, the powered scooter 1 could be any type of conventional person transporter such as a manually operated wheelchair having two large rear wheels which are rotated by hand by the user and two smaller front wheels. The term "transporter" as used in the claims that follows contemplates and includes both self powered conventional scooters, manually operated wheelchairs and walkers with wheels. The holder 7 could have a square or rectangular shaped in cross section component 23 to fit over or into a similarly shaped in cross section armrest. More or less holes and bolts could be used to hold the umbrella holder to the frame of the scooter or wheelchair. The sheath could have a reduced diameter or closed end rather than using a bolt extending across the hollow interior diameter to stop the umbrella from falling through. Clearly, the particular design of the umbrella holder and sheath could be varied to accommodate different structurally configured frames for scooters/wheelchairs or different shaped umbrellas, respectively, as is necessary.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An umbrella holder with a storage sheath mounted on a transporter comprising in combination:

the transporter having a plurality of ground engaging wheels and a supporting frame structure;

the umbrella having an upper canopy movable from an opened extended position to a closed retracted position, said umbrella having a lower end adapted to be received in an umbrella holder and in a storage sheath when in a closed canopy position;

an umbrella holder mounted on said supporting frame of the transporter, said holder having means for receiving and retaining the lower end of the umbrella to maintain the umbrella in the lower end of the umbrella having has surface indentations that complement indentations in said means for receiving and retaining the lower end of the umbrella in the umbrella holder; and the hollow sheath mounted to said supporting frame of the transporter, said sheath having an openable top which can receive a closed end of said umbrella when the umbrella's openable canopy is in a closed retracted position.

2. The combination as claimed in claim 1, wherein said surface indentations on the lower end of the umbrella are threads and said indentations in said means for receiving and retaining the lower end of the umbrella in the holder are threads within a hole in the umbrella holder.

3. The combination as claimed in claim 2, wherein said umbrella holder has a horizontally disposed portion with said threaded hole extending substantially perpendicular to and into said horizontally disposed portion.

4. An umbrella holder with a storage sheath mounted on a transporter comprising in combination:

the transporter having a plurality of ground engaging wheels and a supporting frame structure;

the umbrella having an upper canopy movable from an opened extended position to a closed retracted position, said umbrella having a lower end adapted to be received in an umbrella holder and in a storage sheath when in a closed canopy position;

an umbrella holder mounted on said supporting frame of the transporter, said holder having means for receiving and retaining the lower end of the umbrella to maintain the umbrella in an upright position;

said umbrella holder has a horizontally disposed portion with a threaded hole extending substantially into and in alignment with said horizontally disposed portion; and the hollow sheath mounted to said supporting frame of the transporter, said sheath having an openable top which can receive a closed end of said umbrella when the umbrella's openable canopy is in a closed retracted position.

5. The combination as claimed in claim 4, wherein said transporter's frame structure includes an arm rest on which the umbrella holder is mounted, said arm rest being greater in cross section than the cross section of the horizontally disposed portion of the umbrella holder and adapted to fit over a portion of the holder inserted within the arm rest.

6. The combination as claimed in claim 5, wherein said umbrella holder has a plurality of fastener receiving holes and fasteners used to retain the horizontally disposed portion of the umbrella holder to the arm rest frame structure of the transporter.

7. An umbrella holder with a storage sheath mounted on a transporter comprising in combination:

the transporter having a plurality of ground engaging wheels and a supporting frame structure;

said transporter having an arm rest with the umbrella holder mounted to said arm rest by a clamp which extends around the arm rest and around the umbrella holder;

the umbrella having an upper canopy movable from an opened extended position to a closed retracted position, said umbrella having a lower end adapted to be received in an umbrella holder and in a storage sheath when in a closed canopy position;

an umbrella holder mounted on said supporting frame of the transporter, said holder having means for receiving and retaining the lower end of the umbrella to maintain the umbrella in an upright position; and the hollow sheath mounted to said supporting frame of the transporter, said sheath having an openable top which can receive a closed end of said umbrella when the umbrella's openable canopy is in a closed retracted position.

* * * * *